(12) United States Patent
Cravey

(10) Patent No.: US 8,378,661 B1
(45) Date of Patent: Feb. 19, 2013

(54) SOLAR SIMULATOR

(75) Inventor: William Ray Cravey, Albuquerque, NM (US)

(73) Assignee: Alpha-Omega Power Technologies, Ltd.Co., Albuquerque, NM (US)

( * ) Notice: Subject to any disclaimer, the term of this patent is extended or adjusted under 35 U.S.C. 154(b) by 404 days.

(21) Appl. No.: 12/475,326

(22) Filed: May 29, 2009

Related U.S. Application Data

(60) Provisional application No. 61/057,118, filed on May 29, 2008.

(51) Int. Cl.
*G01R 31/00* (2006.01)

(52) U.S. Cl. ...... 324/96; 324/97; 250/495.1; 250/493.1; 250/494.1; 250/200; 250/205

(58) Field of Classification Search ............ 324/96, 324/97; 250/495.1, 493.1, 494.1, 200, 205
See application file for complete search history.

(56) References Cited

U.S. PATENT DOCUMENTS

| | | | | | |
|---|---|---|---|---|---|
| 2,877,284 | A | * | 3/1959 | Schultz | 136/265 |
| 3,247,367 | A | * | 4/1966 | Rayces | 362/241 |
| 3,379,067 | A | * | 4/1968 | Wallace et al. | 73/865.6 |
| 3,804,531 | A | * | 4/1974 | Kosaka et al. | 356/405 |
| 3,859,539 | A | * | 1/1975 | Allington | 250/575 |
| 3,873,826 | A | * | 3/1975 | Duck et al. | 250/200 |
| 4,032,777 | A | * | 6/1977 | McCaleb | 250/214 B |
| 4,048,493 | A | * | 9/1977 | Lee | 250/205 |
| 4,983,884 | A | * | 1/1991 | Wychulis | 315/151 |
| 5,034,679 | A | * | 7/1991 | Henderson et al. | 324/96 |
| 5,216,359 | A | * | 6/1993 | Makki et al. | 324/754.23 |
| 5,289,114 | A | * | 2/1994 | Nakamura et al. | 324/96 |
| 6,291,763 | B1 | * | 9/2001 | Nakamura | 136/256 |
| 6,444,973 | B1 | * | 9/2002 | Dissey | 250/221 |
| 6,636,336 | B2 | * | 10/2003 | Hart | 359/35 |
| 6,649,896 | B2 | * | 11/2003 | Birrer et al. | 250/205 |
| 6,674,554 | B2 | * | 1/2004 | Hart | 359/25 |
| 6,689,999 | B2 | * | 2/2004 | Haines et al. | 250/205 |
| 7,329,887 | B2 | * | 2/2008 | Henson et al. | 250/494.1 |
| 7,425,457 | B2 | * | 9/2008 | Tokutake et al. | 438/17 |
| 7,576,315 | B2 | * | 8/2009 | Taniguchi et al. | 250/235 |
| 7,619,159 | B1 | * | 11/2009 | Ortabasi | 136/246 |
| 7,906,980 | B1 | * | 3/2011 | Cravey | 324/761.01 |
| 2002/0014886 | A1 | * | 2/2002 | Matsuyama | 324/96 |
| 2002/0071146 | A1 | * | 6/2002 | Hart | 359/35 |
| 2002/0097459 | A1 | * | 7/2002 | Hart | 359/35 |
| 2002/0109872 | A1 | * | 8/2002 | Hart | 359/35 |
| 2003/0071204 | A1 | * | 4/2003 | Sandstrom et al. | 250/237 G |
| 2006/0232261 | A1 | * | 10/2006 | Hiroki | 324/96 |
| 2006/0268283 | A1 | * | 11/2006 | Zaldo Luezas et al. | 356/600 |
| 2007/0114360 | A1 | * | 5/2007 | Lim | 250/205 |
| 2007/0273358 | A1 | * | 11/2007 | Kurosawa et al. | 324/96 |
| 2009/0212763 | A1 | * | 8/2009 | Kurosawa et al. | 324/96 |
| 2009/0261810 | A1 | * | 10/2009 | Askins et al. | 324/96 |
| 2009/0287446 | A1 | * | 11/2009 | Wang et al. | 702/116 |
| 2009/0289617 | A1 | * | 11/2009 | Bohnert | 324/96 |
| 2010/0078579 | A1 | * | 4/2010 | Endo et al. | 250/504 R |
| 2010/0253769 | A1 | * | 10/2010 | Coppeta et al. | 348/58 |
| 2010/0264904 | A1 | * | 10/2010 | Wu et al. | 324/97 |
| 2011/0032362 | A1 | * | 2/2011 | Hall | 348/162 |
| 2011/0036995 | A1 | * | 2/2011 | Binnie et al. | 250/459.1 |
| 2011/0075398 | A1 | * | 3/2011 | Wheatley et al. | 362/97.1 |
| 2012/0049088 | A1 | * | 3/2012 | Klose | 250/459.1 |

* cited by examiner

*Primary Examiner* — Patrick Assouad
*Assistant Examiner* — Lamarr Brown
(74) *Attorney, Agent, or Firm* — Justin R. Jackson; Deborah A. Peacock; Peacock Myers, P.C.

(57) ABSTRACT

A solar simulator which uses a honeycomb structure for providing highly collimated light for testing one or more photovoltaic cells.

15 Claims, 2 Drawing Sheets

US 8,378,661 B1

SOLAR SIMULATOR

CROSS-REFERENCE TO RELATED APPLICATIONS

This application claims priority to and the benefit of the filing of U.S. Provisional Patent Application Ser. No. 61/057,118, entitled "Short Distance Solar Simulator", filed on May 29, 2008, and the specification thereof is incorporated herein by reference.

BACKGROUND OF THE INVENTION

1. Field of the Invention (Technical Field)

Embodiments of the present invention relate to solar simulators. More particularly, embodiments of the present invention relate to solar simulators for testing solar cells, particularly in close proximity thereto.

2. Description of Related Art

Typical large area simulators use a single or multiple lamps in a single lamp house disposed at distance of about a few meters to about 10 meters away to illuminate large areas. Illumination over the large area is achieved by placing the lamps at this distance away from the solar panels to be tested. This arrangement takes up a lot of floor space and requires a large test area. Homogenizing screens may also be used to improve the uniformity over the area to be tested. High power levels must be used in order to drive the lamps sufficiently to achieve the necessary power at the typical distance of 10 meters. Another issue, which is associated with the known types of large area testers, is the need for tight divergent angles of the light source on the target. This is also achieved by placing the light source at a great distance away. There is thus a need for illumination at low divergent angles, i.e. less than 1.5 degrees to as little as 0.2 degrees, for testing large concentrator photovoltaic arrays that utilize lenses that require tight divergent angles which simulate the sun.

BRIEF SUMMARY OF EMBODIMENTS OF THE PRESENT INVENTION

An embodiment of the present invention relates to a photovoltaic test apparatus which includes a light source which light source includes a lamp, and at least one honeycomb collimating structure attached thereto. The light source can include a housing disposed between the lamp and the honeycomb collimating structure. A cell for monitoring an output of the light source can also be provided, which cell can monitor an intensity and/or color of the light source.

In one embodiment, a feedback circuit for maintaining an output of the light source within a predetermined range of desired output values can be provided. A plurality of light sources can be arranged into an array. At least some of the light sources can include a cell for monitoring an output of the light source. The test apparatus can include a filter, and/or a homogenizer, which can be a homogenizing lens. The light source can also include one or more connectors.

An embodiment of the present invention also relates to a method for testing one or more photovoltaic cells which includes forming a light source by disposing a honeycomb collimating apparatus to a lamp; placing the one or more photovoltaic cells in front of the honeycomb collimating apparatus; causing the light source to emit light; and obtaining a reading from at least one of the photovoltaic cells while illuminated with light emitted from the light source. Placing the one or more photovoltaic cells can include placing the one or more photovoltaic cells less than about 5 meters, less than about 3 meters, and/or less than about 1 meter from the honeycomb collimating apparatus.

Optionally, the method can include monitoring an output of the light source with a cell. The lamp can be adjusted based on a reading from the cell. In the method, forming a light source can also include providing one or more filters, and/or one or more homogenizers. The method can also include forming an array from a plurality of light sources, which can be done by joining a plurality of light sources with one or more connectors. The method can also include monitoring at least one of the plurality of light sources with a cell, and can optionally include adjusting a lamp of at least one source based on a reading obtained from the cell.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DESCRIPTION OF THE PREFERRED EMBODIMENTS

As used throughout the specification and claims, the term "lamp" is intended to include any device, apparatus, or system capable of generating light, including but not limited to all electrically-powered lights. The term "lamp" can thus include, but is not limited to, one or more light emitting diodes, incandescent lamps, florescent lamps, arc lamps, as well as combinations thereof.

As used throughout the specification and claims, the term "honeycomb" is intended to include any structure capable of collimating light due to the light having traveled through a plurality of elongated at least substantially parallel openings.

Figure 1:
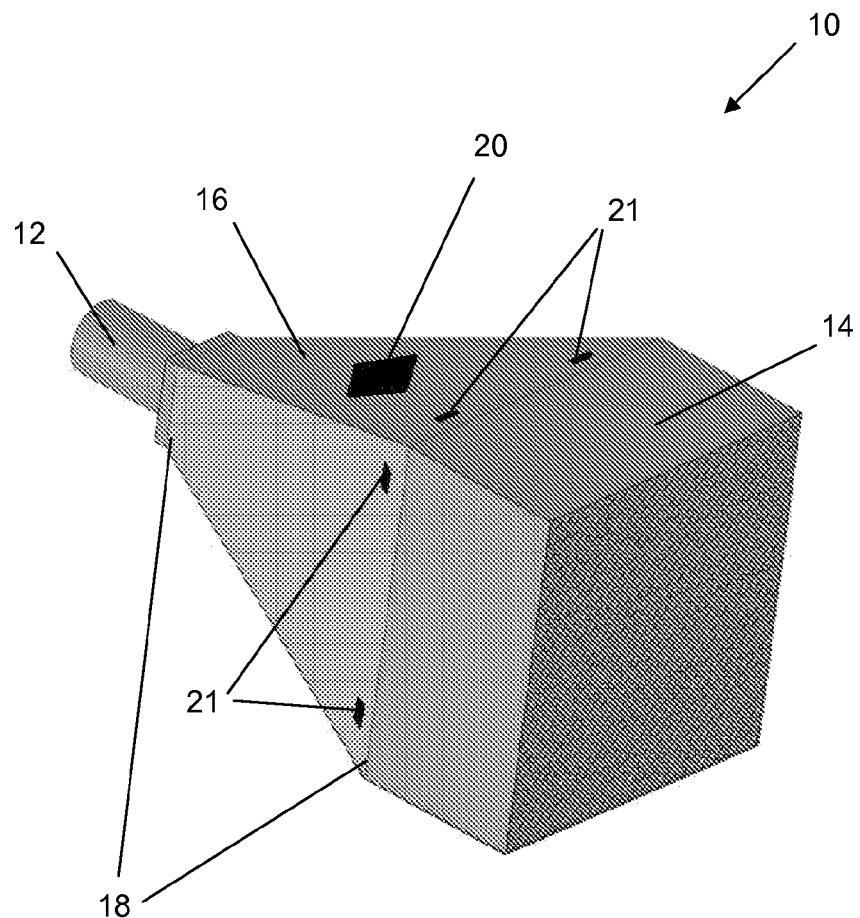
FIG. 1 is a perspective view drawing illustrating a single lamp house according to an embodiment of the present invention.

Embodiments of the present invention can be used for irradiating a large area solar panel. As illustrated in FIG. 1, light source 10 preferably comprises a pulsed or continuous source lamp 12, connected to a collimator 14. Although collimator 14 can be formed from one or more lenses, in a preferred embodiment, a honeycomb type of structure is preferably used to reduce cost. Collimator 12 can optionally be coupled to lamp 10 via housing 16. In a further embodiment, one or more filters 18 can optionally be placed between lamp 10 and collimator 14. Filters 18 can optionally comprise one or more diffusers, one or more collimating elements, homogenizing lenses, or other homogenizers. The output of light source 10 is preferably highly collimated.

In one embodiment, each light source 10, or groups thereof, can optionally have reference cell 20 for measuring the output of that source 10 or group of sources. Cell 20 can be a photovoltaic cell or a photo sensor. The output of cell 20 is preferably used in conjunction with a processor, microcontroller, other circuit, or combinations thereof, to provide feedback and control of source 10 or that group of sources, thereby improving the shot to shot light uniformity and automated matching between sources 10 of one or more arrays 22 (see FIG. 2). In one embodiment, one or more connectors 21 are preferably provided on one or more sides of light source 10 which permit a plurality of light sources 10 to be physically connected to one another, thereby creating array 22. Connectors 21 can be any type of connector capable of joining, at least temporarily, a plurality of light sources 10, including but not limited to latch connectors, hook connectors, pin connectors combinations thereof, and the like.

In a preferred embodiment, each light source 10 preferably has its own lamp 12 and is controlled separately from at least some of the light sources 10 of array 22. In one embodiment, cell 20 is preferably used to monitor light intensity and/or frequency/wavelength, thus permitting the power applied to lamp 12 to be regulated such that intensity and/or uniformity for source 10 is maintained at a desired level. Single sources 10 or groups thereof can optionally be driven together to reduce the cost of individual drivers for each source in some applications.

Figure 2:
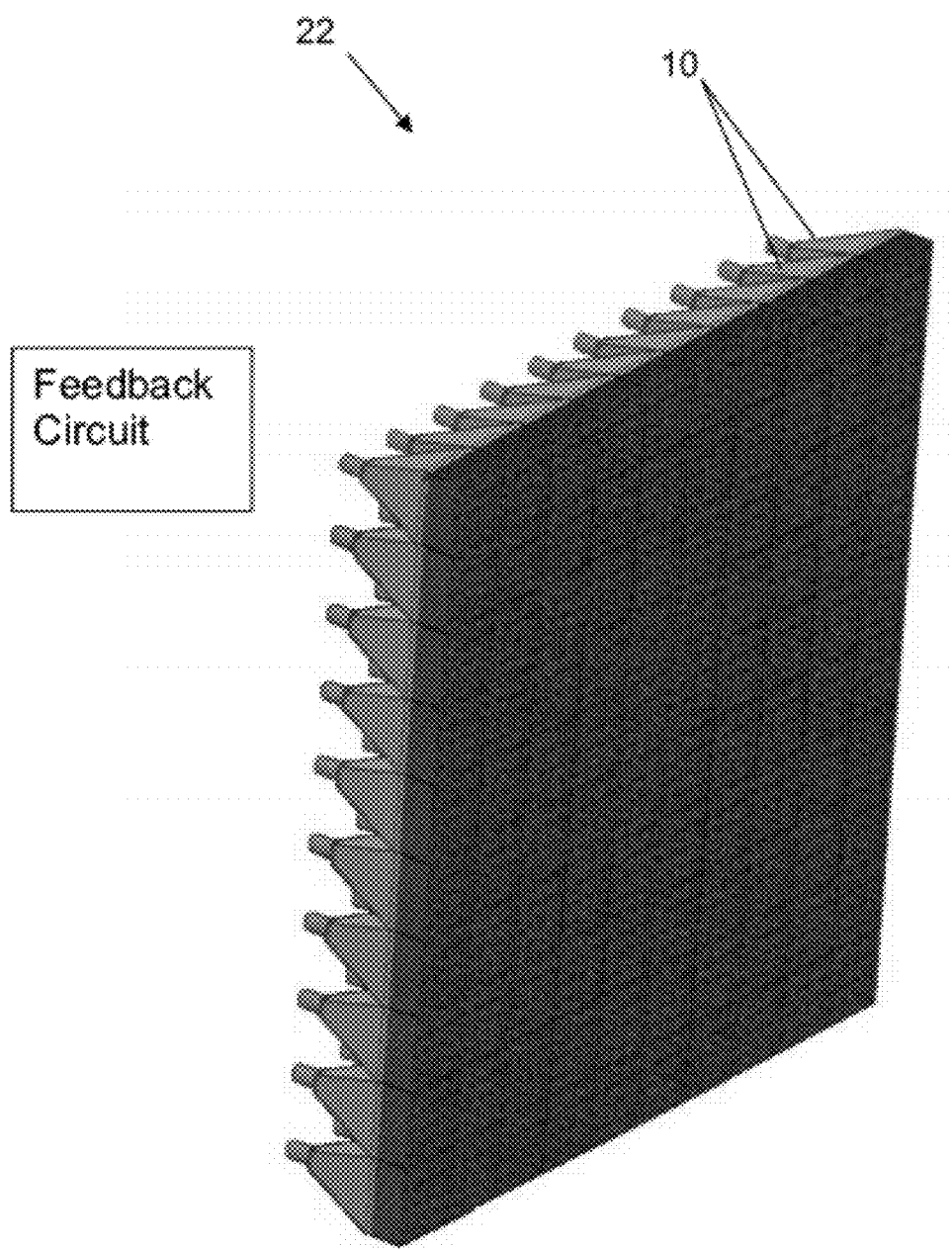
FIG. 2 is a perspective view drawing which illustrates an array of lamp houses of the present invention.

FIG. 2 illustrates an embodiment of the present invention wherein array 22 of individual light sources 10 is provided. The output of the arrayed system can illuminate horizontally and/or vertically and can be less than 5 meters, less than 3 meters, and in some embodiments, less than one meter away from the solar cells or photovoltaic module or panel under test. In one embodiment, each light source is preferably individually computer controlled, and the illuminated area can be adjusted to match the size of the panel by simply adding or removing (or turning on or off) individual light sources 10 of array 22.

In one embodiment, the present invention does not comprise a collimating lens.

Large Area Arrays

Embodiments of the present invention preferably allow the user to test both terrestrial and space solar arrays in a much smaller area due to the close proximity which can be achieved between the light source and the solar panels under test.

Highly Collimated Single Light Source

Embodiments of the present invention can be used for single module testing (i.e. less than about 11 inches square as well as large area testing form about 12 inches square to greater than about 4 meters square. This is optionally achieved by mounting modules in series and/or parallel arrays.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method for testing one or more photovoltaic cells comprising:
    forming a light source by disposing a collimating lens and a honeycomb collimating apparatus to a lamp, the honeycomb collimating apparatus comprising a plurality of elongated at least substantially parallel openings, the honeycomb collimating apparatus not comprising a collimating lens;
    placing the one or more photovoltaic cells in front of the honeycomb collimating apparatus;
    causing the light source to emit light; and
    obtaining a reading from at least one of the photovoltaic cells while illuminated with light emitted from the light source.

2. The method of claim 1 wherein placing the one or more photovoltaic cells comprises placing the one or more photovoltaic cells less than about 5 meters from the honeycomb collimating apparatus.

3. The method of claim 2 wherein placing the one or more photovoltaic cells comprises placing the one or more photovoltaic cells less than about 2 meters from the honeycomb collimating apparatus.

4. The method of claim 3 wherein placing the one or more photovoltaic cells comprises placing the one or more photovoltaic cells less than about 1 meter from the honeycomb collimating apparatus.

5. The method of claim 1 further comprising monitoring an output of the light source with a cell.

6. The method of claim 5 further comprising adjusting the lamp based on a reading from the cell.

7. The method of claim 1 wherein forming a light source further comprises providing one or more homogenizers.

8. The method of claim 1 further comprising forming an array from a plurality of light sources.

9. The method of claim 8 wherein forming an array comprises joining a plurality of light sources with one or more connectors.

10. The method of claim 9 further comprising monitoring at least one of the plurality of light sources with a cell.

11. The method of claim 10 wherein monitoring comprises adjusting a lamp of at least one source based on a reading obtained from the cell.

12. A photovoltaic test apparatus comprising:
    a light source, said light source comprising:
        a lamp;
        a collimating lens; and
        at least one honeycomb collimating structure attached thereto, said honeycomb collimating structure comprising a plurality of elongated at least substantially parallel openings, said honeycomb collimating structure not comprising a collimating lens.

13. The apparatus of claim 12 wherein a plurality of said light sources are arranged into an array.

14. The apparatus of claim 13 further comprising a plurality of cells for monitoring a respective one of said light sources.

15. The apparatus of claim 14 further comprising a feedback circuit for maintaining an output of each of said light sources within a predetermined range of a desired output value.

\* \* \* \* \*